(12) United States Patent
Lencevicius et al.

(10) Patent No.: US 8,521,238 B2
(45) Date of Patent: *Aug. 27, 2013

(54) POWER MANAGEMENT PROFILE

(75) Inventors: Raimondas Lencevicius, Woburn, MA (US); Alexander Ran, Needham, MA (US); Eduardus Metz, Belmont, MA (US)

(73) Assignee: Nokia Corporation (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,592

(22) Filed: Sep. 6, 2011

(65) Prior Publication Data

US 2011/0319144 A1 Dec. 29, 2011

Related U.S. Application Data

(63) Continuation of application No. 10/172,508, filed on Jun. 17, 2002, now Pat. No. 8,036,718.

(51) Int. Cl.
*H04M 1/00* (2006.01)

(52) U.S. Cl.
USPC ........ 455/574; 455/432.3; 455/572; 455/450; 455/13.4; 455/127.1

(58) Field of Classification Search
USPC .......................................................... 455/574
See application file for complete search history.

(56) References Cited

U.S. PATENT DOCUMENTS

| | | | | |
|---|---|---|---|---|
| 6,072,784 | A * | 6/2000 | Agrawal et al. | 370/311 |
| 6,427,072 | B1 * | 7/2002 | Reichelt | 455/404.1 |
| 6,704,583 | B1 * | 3/2004 | Yoshioka | 455/574 |
| 2003/0002465 | A1 * | 1/2003 | Glendining et al. | 370/337 |

FOREIGN PATENT DOCUMENTS

GB 2345410 A * 7/2000

* cited by examiner

*Primary Examiner* — Olumide T Ajibade Akonai
*Assistant Examiner* — Randy Peaches
(74) *Attorney, Agent, or Firm* — Banner & Witcoff, Ltd.

(57) ABSTRACT

The present invention provides a method and system suitable for managing the power consumption of a mobile communication device by way of a user-selectable profile. In response to receiving a power management-initiating signal the mobile communication device performs at least one of the following: Receipt of incoming communication is deferred while other functionality of the mobile communication device is retained; outgoing communication is grouped into a single transmission; and a subsequent transmission is deferred if the transmission requires power exceeding a predetermined threshold.

16 Claims, 7 Drawing Sheets

POWER MANAGEMENT PROFILE

CROSS-REFERENCE TO RELATED APPLICATIONS

This application is a continuation of U.S. patent application Ser. No. 10/172,508, filed Jun. 17, 2002, the contents of which are incorporated herein by reference.

FIELD OF THE INVENTION

This invention relates generally to mobile communication devices and, in particular, to power management for mobile devices.

BACKGROUND OF THE INVENTION

Wireless communication is becoming more widespread as a continually increasing number of users acquire and place into operation ever-greater numbers of mobile communication devices. Along with this increase in number of mobile devices there is an increase in the amount of time the mobile devices are in use. This places an ever-increasing demand on the amount of time mobile devices are able to provide functionality between rechargings or repowerings.

The need for longer periods of usability becomes even more apparent as more functionality is incorporated into mobile communication devices. For example, many mobile communication devices now include Personal Information Management (PIM), or Personal Digital Assistant (PDA), camera, music player (MP3 or the like), or gaming functionality in addition to their communication capabilities. Therefore these devices are potentially in use even when the user is not using the communication capabilities of the device. This additionally functionality places further demands on the power reserves of the mobile device.

Currently the most effective way of conserving power, and thereby extending the amount of time the device can be used, is simply turning the device off. The problem with this is that it also reduces the effectiveness of the mobile device. In cases, as mentioned above, where the device has additional functionality this functionality cannot be used when the device is off. In addition, turning the device on requires an additional power draw, above the usual operational power consumption of the device, which serves to further reduce the power reserves of the device.

Consequently, a need exists for power management on mobile communication devices that reduces the power consumption of the device while retaining at least some of the functionality of the device.

SUMMARY OF THE INVENTION

The present invention provides a method and system suitable for managing the power consumption of a mobile communication device. The mobile communication device receives a power management-initiating signal. In response to receiving a power management-initiating signal one or more of the following functions is performed: Receipt of incoming communication is deferred while other functionality of the mobile communication device, not otherwise disabled, is retained; outgoing communications are grouped into a single transmission; and a subsequent transmission is deferred if the transmission requires power exceeding a predetermined threshold.

In another embodiment, disabling at least part of the backlighting of the mobile communication device may also be performed in response to receiving a power management-initiating signal.

Any one or any combination of the above mentioned procedures may be initiated in response to the power management-initiating signal. Other features and advantages will be apparent to one skilled in the art given the benefit of the following disclosure.

DETAILED DESCRIPTION OF THE INVENTION

Currently, mobile communication devices use various profiles for different environmental conditions, e.g., silent or vibrate profiles that turn off the ringer of the device, and outdoor profiles that can be enabled in noisy outdoor environments. What has not been done is using a profile for power management. Features that save power have been available (such as deactivating backlighting) but have never been implemented as part of a power management profile. Incorporation of a power management profile provides the user with a convenient way of implementing such features with the purpose of conserving power. The activation of such a power management profile modifies mobile communication device functionality so as to realize power savings.

As can be appreciated by one skilled in the art, there are various ways to implement such a power management profile. Several preferred embodiments of how to implement a power management profile are disclosed herein. Other embodiments, applications, and features will be apparent to one skilled in the art given the benefit of this disclosure.

Figure 1:
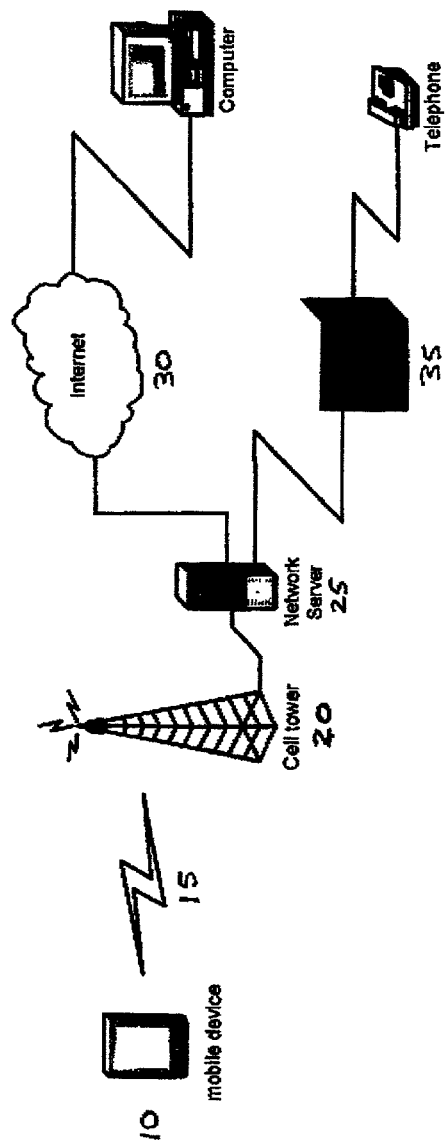
FIG. 1 shows a typical system for a mobile communication device.
Figure 2:
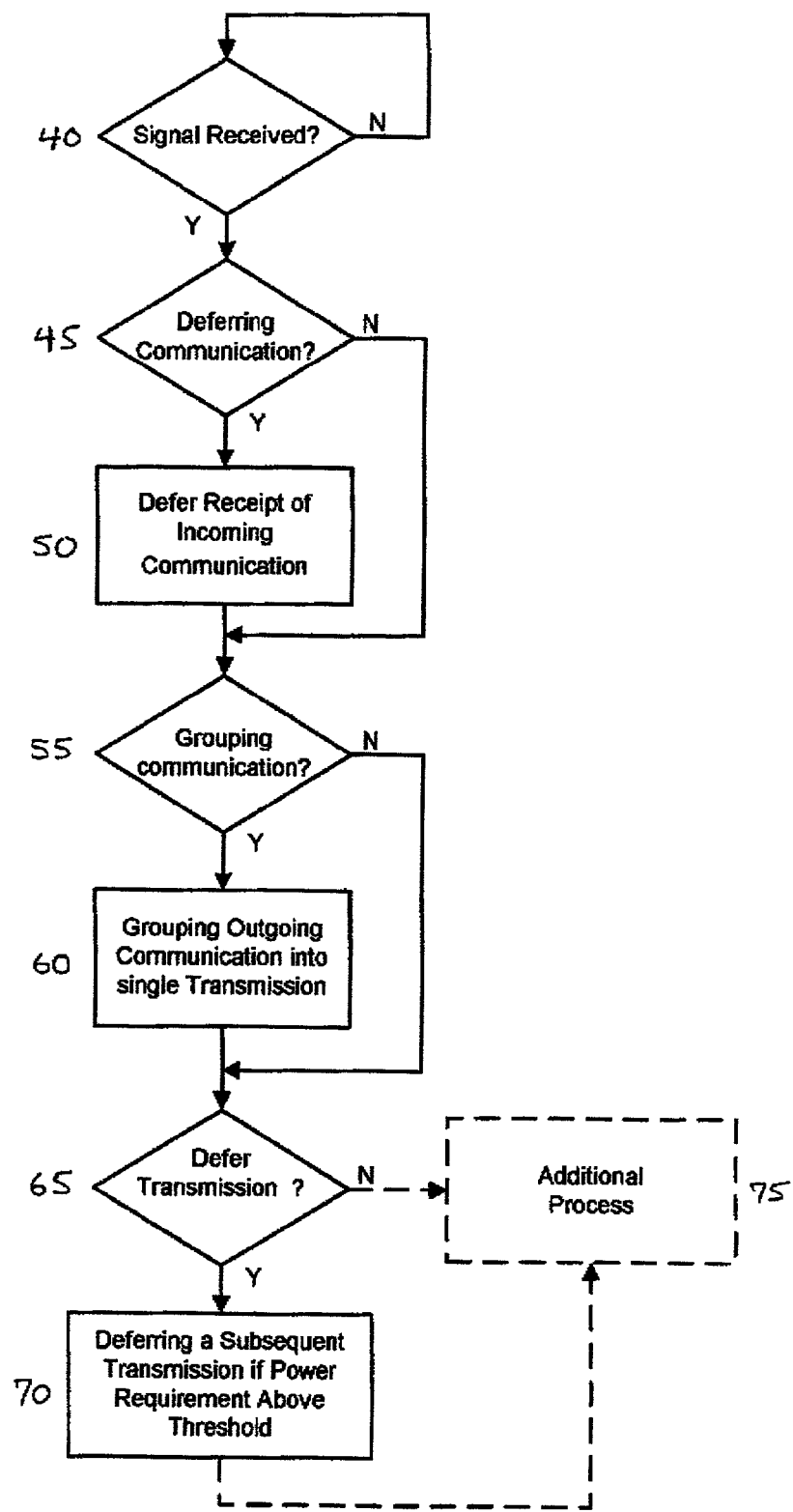
FIG. 2 is a flow diagram of a preferred embodiment of a power management method.

FIG. 1. depicts a typical system in which a mobile communication device 10 is in wireless communication 15 with a tower 20 which is in turn in communication with a server 25 for the wireless network. The server 25 also serves to connect the wireless network with the Internet 30 and traditional telephone service (POTS) 35.

In accordance with a first preferred embodiment, a method suitable for managing the power consumption of a mobile communication device comprises the steps of: receiving a power management-initiating signal; and performing, in response to the said step of receiving said power-management-initiating signal, one or more of: deferring receipt of an incoming communication while retaining other functionality of the mobile communication device, grouping multiple outgoing communications into a single transmission, and deferring a subsequent transmission if said transmission requires power exceeding a predetermined threshold.

One implementation of this method for power management for mobile communication devices can be seen in FIG.

2. The first step 40 checks to see if a power management-initiating signal has been received. If a signal has not been received then it loops back until a signal is received. If a signal is received then the next step 45 is determining if incoming communication is to be deferred. Whether this process, or any other process, is to be performed depends on how the power management profile has been configured. The power management profile may be configured by the user, by the device software, or at the factory depending on application or implementation. If communication is to be deferred then deferring of incoming communications is initiated 50. The process of deferring incoming communication is described in detail below. The next step 55 is determining if outgoing communication is to be grouped. If outgoing communication is to be grouped then grouping communications is initiated 60. The process of grouping outgoing communication into a single transmission is described in detail below. The next step 65 is determining if outgoing transmissions are to be deferred. If transmissions are to be deferred then deferring of a subsequent transmission is initiated 70. The process of deferring a subsequent transmission if said transmission requires power exceeding a predetermined threshold is described in detail below. At this point at least one of the processes should have been initiated. Optionally, additional processes can also be initiated 75.

The term "mobile communication device" should be understood to include cellular telephones; Personal Digital Assistants (PDAs) with telephonic or wireless communication capabilities such as those manufactured by PALM, Inc.; Instant Messaging Devices, such as those manufactured by Blackberry, Inc.; notebook computers with telephonic or wireless communication capabilities; and other mobile devices that can communicate using various transmission technologies (including CDMA, GSM, TDMA, and others) or media (radio, infrared, laser, and the like).

Figure 3:
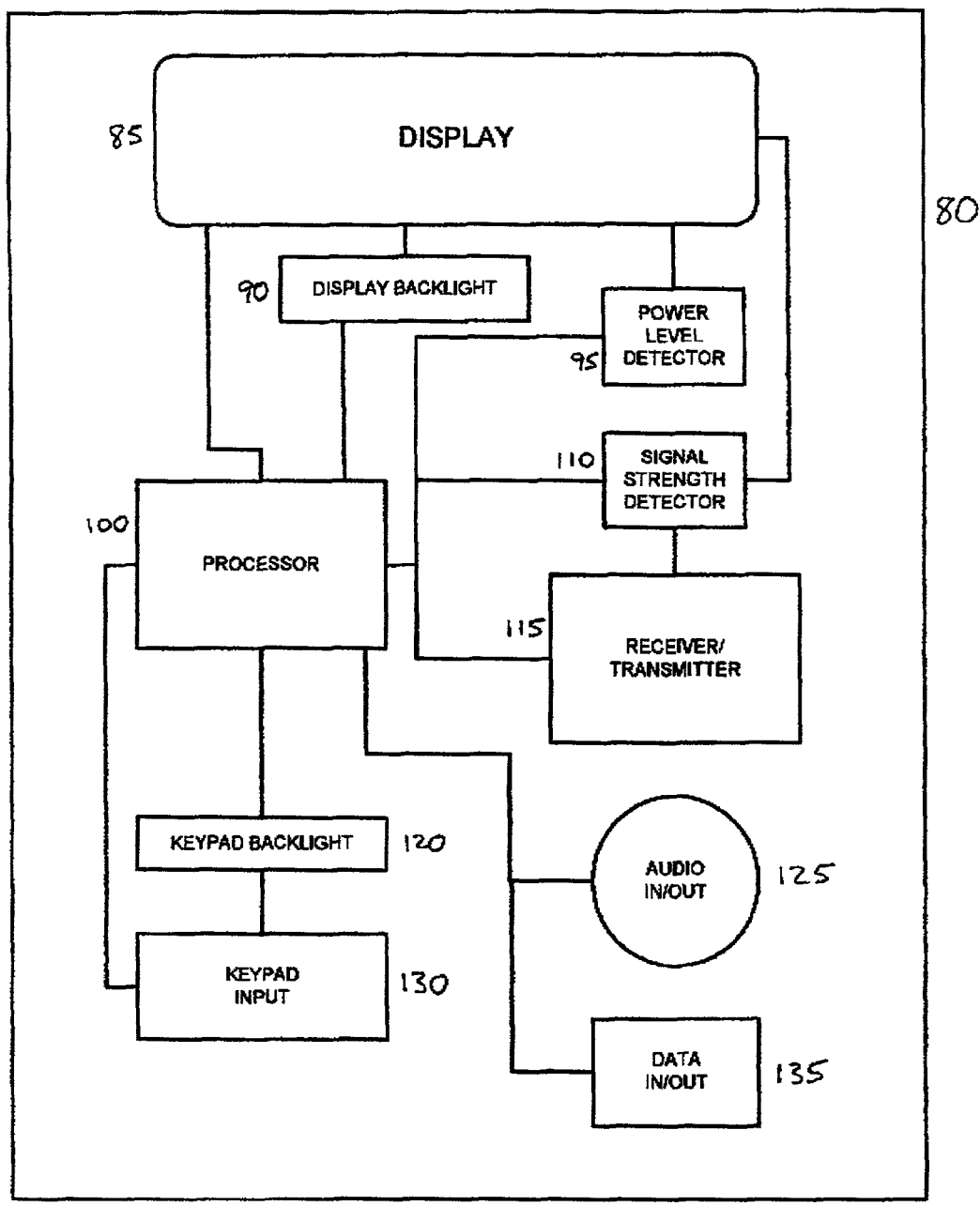
FIG. 3 is a block diagram of an embodiment of a mobile communication device.

FIG. 3 shows one possible embodiment of a mobile communication device 80. Typically the device has a display 85, a processor 100, receiver/transmitter circuitry 115, a keypad input 130, and audio input and output capability 125. The mobile communication device may also have a power level detector 95, a signal strength detector 110, display backlighting 90, keypad backlighting 120, and a data input/output port 135. Other implementations and features will be apparent to one skilled in the art given the benefit of this disclosure.

The power management-initiating signal may be any signal suitable to initiate power saving measures. Typically the power management-initiating signal is an electronic signal that can be generated, transmitted, received, and understood by electronics typically employed in mobile communication devices. In a preferred embodiment the power management-initiating signal is generated by the user who has selectively engaged the power management profile. Typically this is done through the user interface of the mobile communication device. It may be selectable through a menu, button, or keystroke combination.

In another embodiment the power management-initiating signal is generated in response to a decrease in the power level of the mobile communication device below a predetermined threshold. Most mobile communication devices have some sort of power level meter or readout. When the power level as indicated by this meter or readout drops below the predetermined threshold a power management-initiating signal is generated. The predetermined threshold level may be factory set or user defined depending on application or use. Other embodiments will be apparent to one skilled in the art given the benefit of this disclosure.

Figure 4:
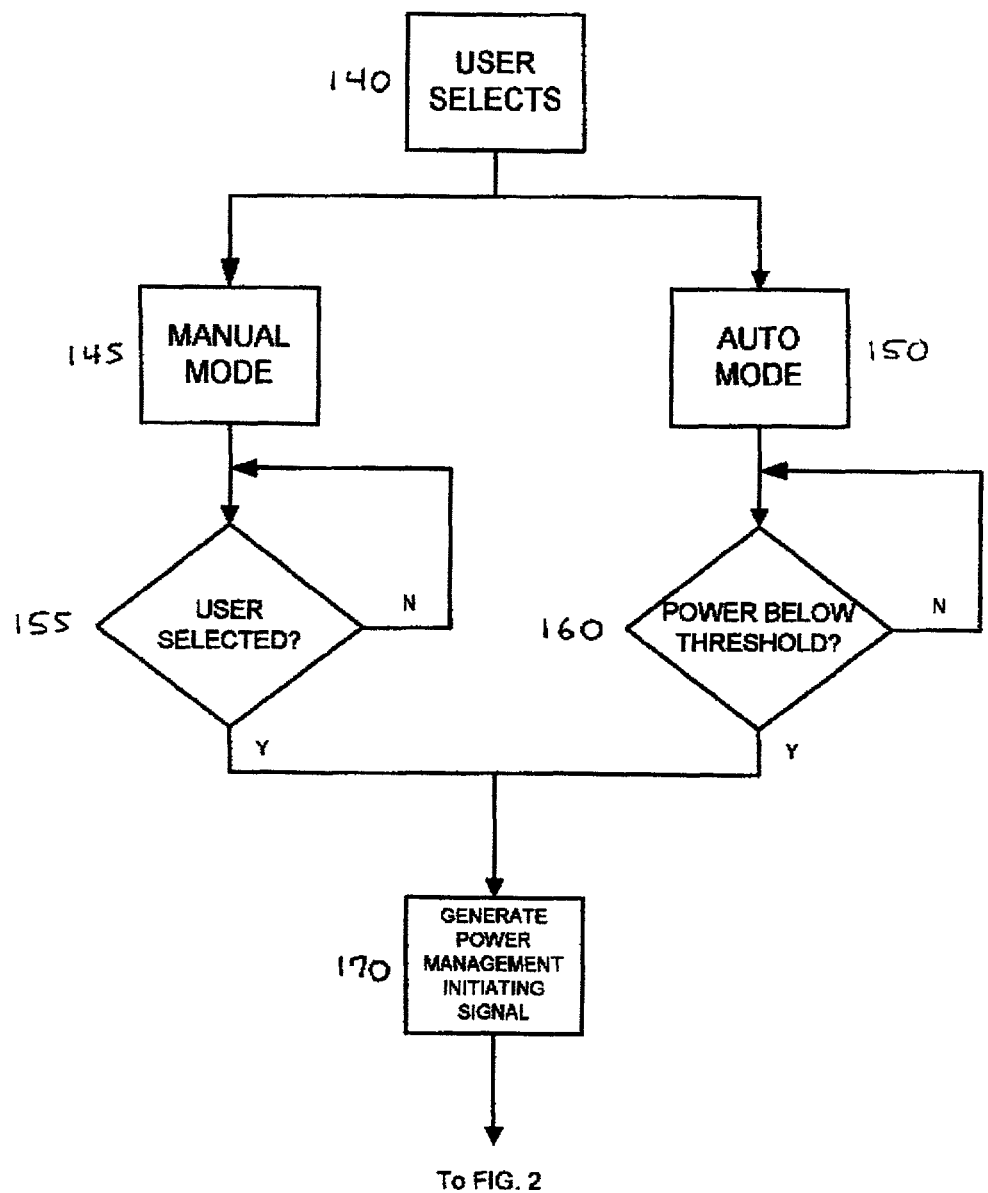
FIG. 4 is a flow diagram of a possible implementation for generating a power management-initiating signal.

FIG. 4 shows one implementation of the embodiments described above. The User selects 140 to have the power management profile initiated manually 145 or automatically 150. If the user places the mobile communication device in manual mode 145 then the system waits until the user decides to activate the power management profile 155. Once the user activates the power management profile, such as through the user interface of the device, a power management-initiating signal is generated 170. If the user places the mobile communication device in auto mode 150 the system waits until the power level of the device drops below a predetermined threshold 160. Once the power level drops below the threshold then a power management-initiating signal is generated 170. Other implementations will be apparent to one skilled in the art given the benefit of this disclosure.

One or more of the following actions is performed in response to generation of the power management-initiating signal: deferring receipt of a subsequent incoming communication, grouping outgoing communication into a single transmission, and deferring a subsequent transmission if said transmission requires power exceeding a predetermined threshold. These steps, processes, or functions (also referred to as features of the power management profile) are discussed in more detail below.

It should be understood that the term "communication" refers to any form of electronic communication transferred and received by mobile communication devices including protocols and features (telephony, data networking, SMS messaging, and the like) on various transmission technologies (including CDMA, GSM, TDMA, Bluetooth, Wi-fi, and others), or media (radio, infrared, laser, and the like).

In a preferred embodiment deferring incoming communications while retaining functionality of the mobile communication device otherwise not disabled includes temporarily disabling or turning off receipt of incoming calls or Short Message Service (SMS) messages and directing mobile terminated calls and SMS messages to the voicemail or SMS server storage. The user may be notified that a new voice or SMS message is waiting. In this mode of operation the user can make calls and use applications, but call attempts initiated by other people do not reach the user's mobile communication device. Basically the mobile device behaves like the device has been turned off but with the advantage of not having to turn the phone off. This is advantageous because turning the device off and then on again is an expensive operation in terms of power. The initial current spike occurring when the device is turned on may drop battery voltage below a minimal operational level. In such cases the device will not boot, even though it can function when the current is drawn at such voltage levels. Deferring incoming communications becomes more useful in high-functionality phones such as devices that include Personal Digital Assistant (PDA) functionality where the use of applications including games and multimedia has the same priority as communications.

To disable and defer the incoming communications, various mechanisms can be used. In one preferred embodiment, the mechanism provides for shutting down the communications with a base station via the device. This action disables incoming communications from the base station and provides additional power savings as the device is temporarily out of communication with the network.

In another embodiment incoming communications are deferred using a network service. One such service is Selective Call Acceptance (SCA). SCA allows users to accept call attempts from a limited number of calling parties. The user enters the phone numbers to be accepted into a list. When activated, the mobile communication device will receive communications only when contacted by the members of the list. All other calling parties will hear an announcement that the user is not accepting calls at this time. Alternatively calls not accepted may be routed to the voice mail system. Using SCA, the power management profile would essentially select all numbers to go into the voice mail. In another preferred embodiment, call forwarding functionality on the network, which is activated or deactivated via Unstructured Supplementary Services Data (USSD). The mobile device sends the relevant USSD to the network instructing absolute call forwarding to the voicemail box when the power management profile is activated. Then when the power profile is disabled, the USSD to deactivate call forwarding can be sent. In a preferred embodiment an icon on the mobile communication device display informs the user of the active call forwarding, so it would be clear when this feature is on or off. SMS messages may also be forwarded in this manner. It should be noted that using network services for communication deferment allows for configurations that permit emergency or priority calls to be received.

In still another preferred embodiment the deferring of incoming communications is implemented at the mobile communication device in which the user partitions phone numbers into groups. All incoming calls or just calls from certain groups can then be rejected at the mobile device. Unlike network-based communication disabling, this feature requires the mobile device to receive the call before rejecting it, so it consumes power and uses network resources. However, this feature allows the mobile communication device to display the caller ID and a missed call message.

Figure 5:
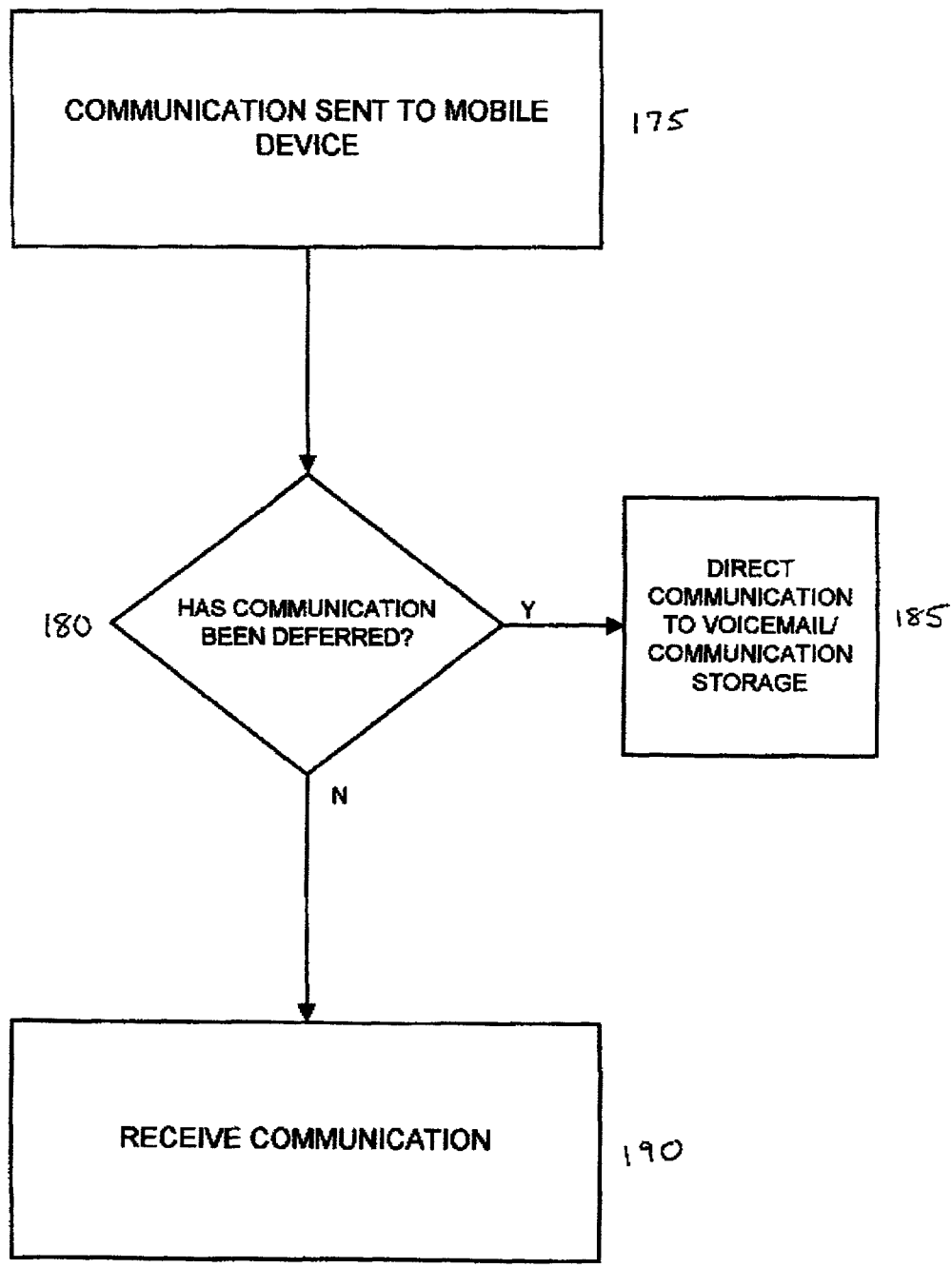
FIG. 5 is a flow diagram of a possible implementation for deferring incoming communication.

A flow diagram of the above-disclosed embodiments can be seen in FIG. 5. A communication, such as a call, is made to the mobile communication device 175. It is then determined if incoming communications are being deferred 180. This may include any of the methods discussed above such disabling communication with the base station, SCA, or call forwarding. If incoming communications are being deferred then the incoming communication is directed to communication storage 185 such as a voicemail box or SMS message storage server. If communication is not being deferred then the mobile communication device will receive the communication 190. It should be understood that any of the above-disclosed methods and approaches for deferring incoming communication also allow for configurations that permit emergency or priority calls to be received. For example, priority numbers can be removed from or not placed on the list of numbers to be not accepted, forwarded, or rejected. Other methods or approaches for deferring incoming communications will be apparent to one skilled in the art given the benefit of this disclosure.

In certain preferred embodiments, outgoing communications to be grouped include SMS messages. Traditionally, SMS messages are sent immediately and displayed on the target device as soon as possible depending on the provider network infrastructure and roaming agreements. Most of the time the SMS messages are delivered in seconds after they are sent. However, in terms of energy efficiency, it is better to group the outgoing SMS messages and send them as a single transmission.

Figure 6:
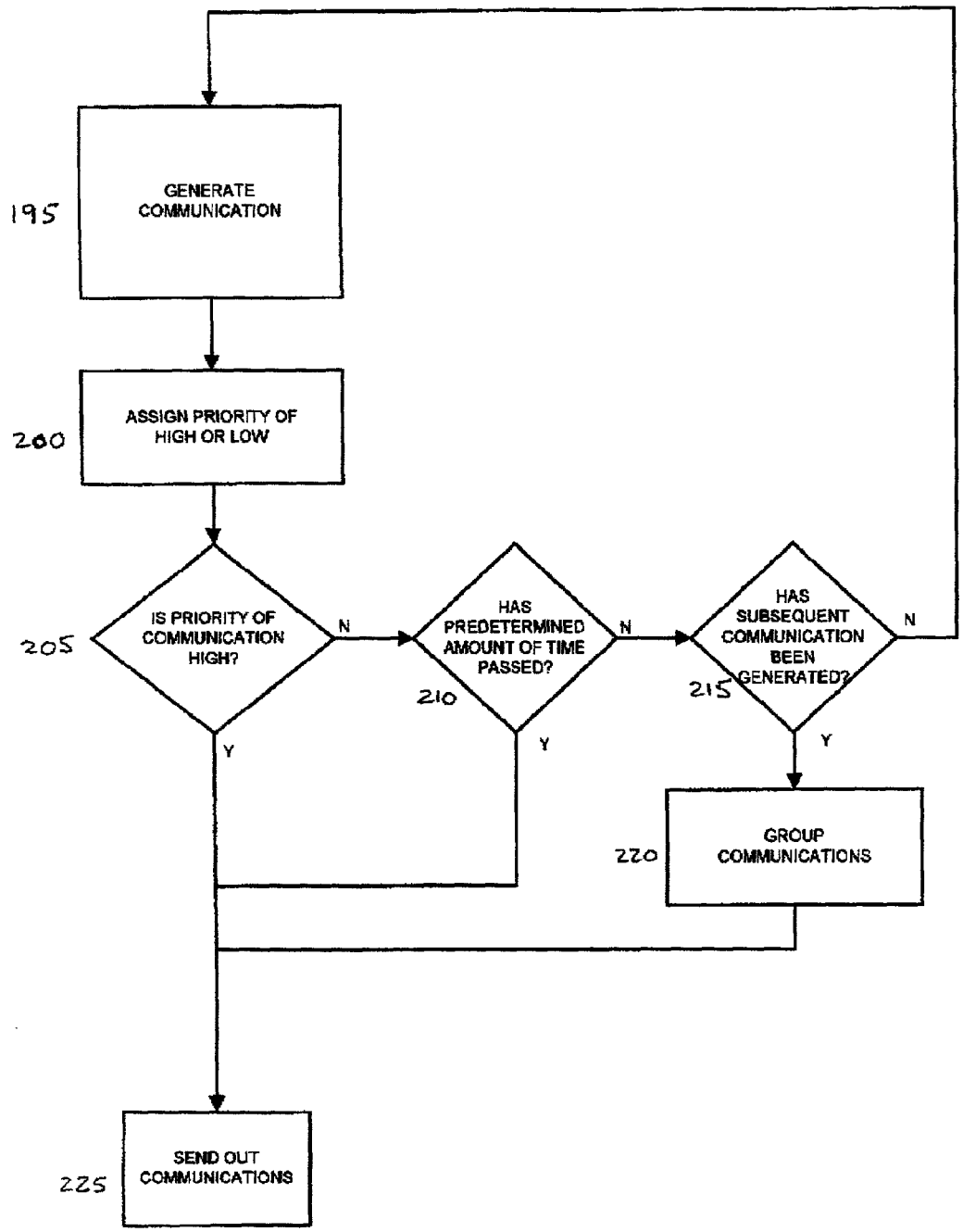
FIG. 6 is flow diagram of a possible implementation for grouping outgoing communication.

In a preferred embodiment, as shown in FIG. 6, grouping outgoing communication involves assigning every generated outgoing communication 195 a priority of "HIGH" or "LOW" 200. The priority of an outgoing communication is selected by the user. If a communication is determined to be a "HIGH" priority message 205 it is sent immediately 225. "LOW" priority messages would be kept on the device for a pre-established amount of time 210, for example, 30 minutes.

If during the pre-established time another message is generated with either "HIGH" or "LOW" priority 215, the messages would be grouped 220 and sent together 225. The term "grouping" as used here refers to combining several communications into one communication, sending communications together in one transmission, or any other method of compressing or combining communications to reduce the number of transmissions.

In another embodiment the messages could also be grouped and sent only when the mobile communication device detects a strong RF field emanating from the base station(s). If a strong RF field is detected there is a greater likelihood that any messages would require less power to transmit. Most mobile communication devices, such as cellular phones, have signal strength indicators. In this embodiment the grouped messages would only be sent if the signal strength indicator reads above a certain predetermined level, for example 3-4 bars. The predetermined signal strength level could be preset at the factory or set by the user depending on application. SMS messaging is but one embodiment of outgoing communication that can be grouped. Other communication that can be grouped will be apparent to one skilled in the art given the benefit of this disclosure.

In accordance with certain preferred embodiments, deferring a subsequent transmission if the transmission requires power exceeding a predetermined threshold includes the step of disabling outgoing communications when the transmission signal requires a high power level from the mobile communication device. The decision whether to proceed or to cancel communication setup depending on the power level needed for the call would be made before setting up a communication. This does not interfere with existing network control of power levels since no network activity is initiated before decision.

The transmission power used by mobile communication devices depends on a variety of factors. The transmission power may depend on the distance the mobile communication device is from a base station and on the device density in a cell, i.e. if the number of devices currently transmitting in a certain cell is high, the device may use a higher power level to avoid interference. Interference from weather, buildings, tunnels, and landscape features can also increase transmission power. The signal strength indicator found on many mobile communication devices is often an indicator of such transmission power level requirements. When a weak signal is indicated the mobile communication device would require more power to transmit. A strong signal requires less power. The protocol or transmission technology may also affect the transmission power level required. For example, the data communication uplink and downlink speed can affect the transmission power level. Typically, as the link speed increases the power required increases. Accordingly, it is beneficial for transmissions to be disabled where the required transmission power is high. In preferred embodiments, emergency or priority communications would not be affected by this feature and the user could override the feature if necessary. In certain embodiments, when implemented, this power level would be checked before performing a transmission and the user informed if it is too high.

Figure 7:
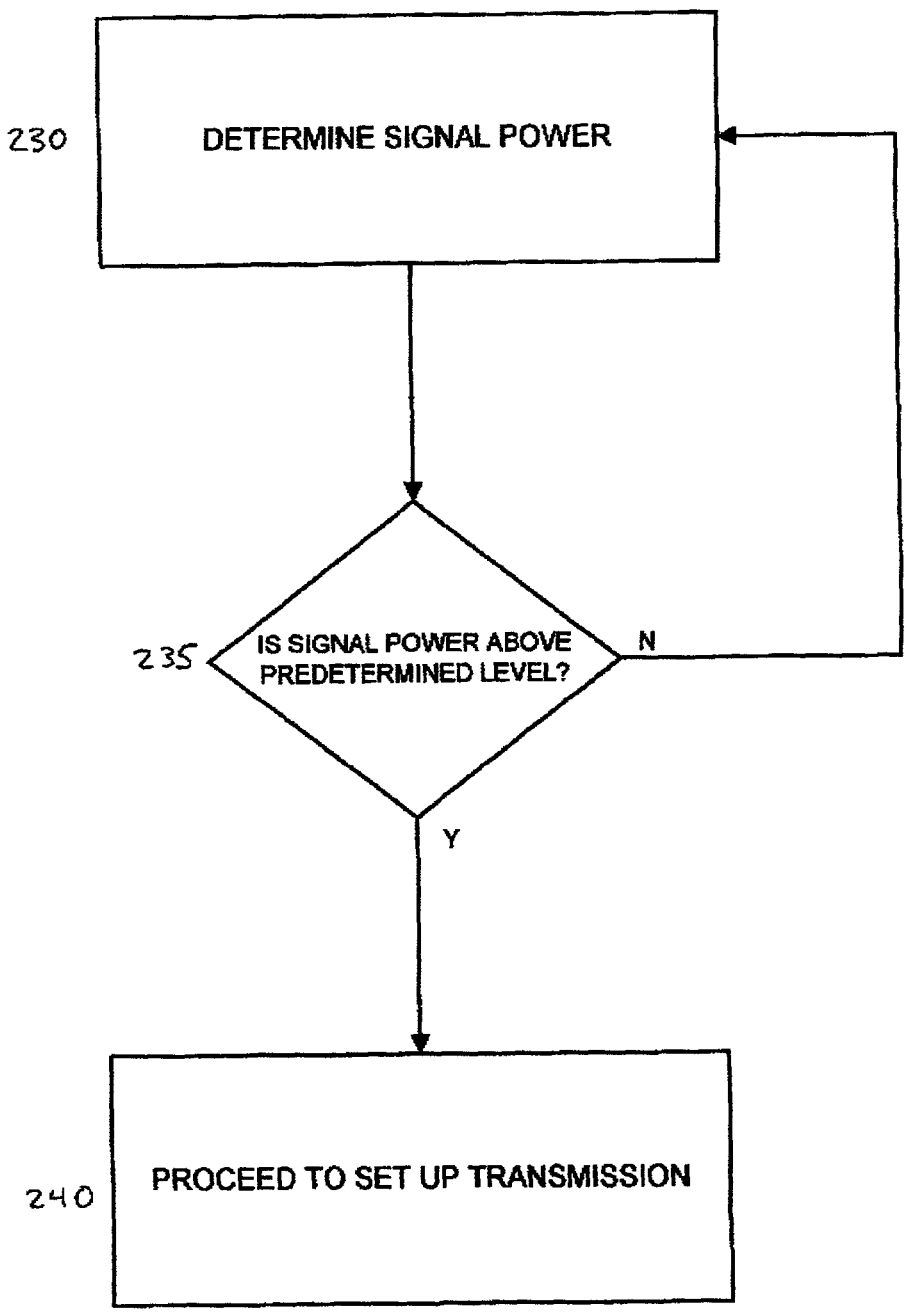
FIG. 7 is a flow diagram of a possible implementation for deferring outgoing transmissions.

One implementation for carrying out the above method can be seen in FIG. 7. First the signal power is determined 230. The signal power is then checked to see if the power level is above a predetermined level 235. This level may be factory set or user defined depending on application. If the signal power level is above the predetermined level then the communication is allowed to proceed 240. If the signal power level is below the predetermined level then the transmission is deferred until the signal power is above the predetermined level.

In specific embodiments where the mobile communication device is operative on a GSM network, the RF field strength can be used to predict the fixed-point power level to which the call would be adjusted. I.e. if the RF field is weak, it is assumed that the call will not adjust to low power level and such a transmission will not be initiated.

In another embodiment in which the mobile communication device functions in both analog and digital modes, such as many dual band or tri-mode mobile phones already available, deferring a subsequent transmission if said transmission requires power exceeding a predetermined threshold may include disabling the analog functionality of the device.

In still another embodiment, a determination of signal quality is made by both network and mobile communication device. The signal quality determination is a function of the number of corrupt packets received at each end and is often a better indicator of the likelihood of making a successful call than signal strength. Therefore in certain embodiments this measurement of signal quality is used as a determining factor as to whether a transmission will be initiated.

In addition to the above disclosed methods of managing power consumption in mobile devices, the backlighting of the mobile communication device can also be disabled as part of a power management profile. Backlight disabling can include complete backlight disabling or adaptable backlighting. Adaptable backlighting specifies the time interval for which backlighting remains on as a function of the usage scenario. In one method of adaptable backlighting, there are provided selectable levels which have corresponding backlighting intervals. For example levels 0, 1, 2, and 3 could correspond to backlighting intervals of 0, 5, 10, and 15 seconds respectively. The time for which backlight is used after the last event is a function of the mobile communication device's usage scenario. For example, when the user does not answer a communications such as a call, the backlight is not useful at all and can be disabled immediately after audio or vibration alerting has stopped. The backlight is on during the incoming communication alert and user can see the information. However, once alerting stops, the device can disable the backlight if the user does not accept the call. In this scenario level 0 backlight enabling is applicable. On the other hand, if the user answers a call, the backlight can stay on after the answer for a short time as in level 1. Longer backlight enabling, such as level 2 or 3, is more appropriate and pleasing to the user when the periods between key presses are of greater duration. Examples of such activities are menu browsing and application execution.

Table I provides the events that trigger the corresponding backlight enabling level and proposed backlight idle enabling levels for a variety of common usage scenarios according to one embodiment.

TABLE 1

| Scenario | Trigger | Proposed Backlight Enabling Level |
| --- | --- | --- |
| Outgoing call | Call initiation (TALK button press) | Level 1 |
| Incoming call, answer | Answering (TALK button press) | Level 1 |
| Incoming call, no answer | Alert termination | Level 0 |
| Message arrival alert | Alert initiation | Level 1 or 2 |
| Menu browsing | Most recent key press | Level 2 |
| Application execution (including SMS read + write) | Most recent key press | Level 2 or 3 |
| Application termination | END key press | Level 1 |
| Idle mobile phone | END key press | Level 1 |

In another embodiment, the keypad backlights are controlled separately apart from the display backlights rather than having both turned on and off as one. For example, just the display backlight could be used when showing a message to the user leaving the keypad backlight disabled. Still other embodiments may have a "soft-dim" feature, where the display backlight slowly turns down before turning off. Some mobile communication devices displays are so large that more than one backlight is needed to light the whole display. In such devices the backlights may be controlled individually to only illuminate relevant parts of the display. For example, upon an incoming call, the backlighting would just light up the caller ID part of the screen and leave the balance of the display unlit.

Practical implementation can be achieved or implemented by electronic components such as processors, memory, transceivers, receivers, and other such devices typically found in or suitable for use in mobile communication devices as well as any software or other machine readable code necessary for the operation of such devices.

It should be understood that each of the functions or procedures of: deferring receipt of a subsequent incoming communication; grouping of outgoing communications into a single transmission; and deferring transmission of a subsequent high power communication if said transmission requires exceeding a predetermined threshold may be implemented individually, or in any combination. Each function provides an amount of power saving in exchange for functionality. Adding additional functions provides additional power savings along with additional compromise of functionality. In some embodiments the user may be able to select the level of power management. For example there may be preset levels of Low, Medium, and High. Selecting the low level would perform one of the functions. Selecting Medium would perform two of the functions. Selecting High would perform three of the functions. This is but one possible implementation, other implementations will be apparent to one skilled in the art given the benefit of this disclosure.

It should also be understood that the provided list of functions is by no means comprehensive or exhaustive. Additional features will be apparent to one skilled in the art given the benefit of this disclosure.

What is claimed is:

1. A method comprising:
receiving a power-management-initiating signal; and
grouping, in a mobile communication device, a plurality of outgoing communications into a single transmission in response to the power-management-initiating signal by delaying a first one of said outgoing communications for a predetermined period of time, and by grouping the delayed first outgoing communication with one or more additional outgoing communications that are requested during said predetermined period of time, wherein said predetermined period of time is determined by the mobile communication device waiting until it detects that a measured radio frequency (RF) field is stronger than a predetermined level.

2. The method of claim 1, further comprising:
deferring receipt of an incoming communication in response to the power-management-initiating signal.

3. The method of claim 1, further comprising:
reducing the power consumption of the mobile communication device by disabling high power outgoing communications in response to the power-management-initiating signal.

4. The method of claim 1, further comprising:
disabling a part of a backlight of the mobile communication device in response to the power-management-initiating signal.

5. The method of claim 1, wherein the power-management-initiating signal is received in response to a user interface of the mobile communication device.

6. The method of claim 1, wherein the power-management-initiating signal is generated in response to the power level of the mobile communication device being lower than a predetermined threshold.

7. The method of claim 1, wherein said grouping of said plurality of outgoing communications comprises grouping said communications based on assigned priority levels of said communications.

8. The method of claim 7, wherein said grouping of said plurality of outgoing communications comprises grouping high priority communications for said single transmission, and deferring low priority communications until a subsequent transmission.

9. The method of claim 1, wherein the power-management-initiating signal comprises an electronic signal.

10. An apparatus, comprising:
a transmitter; and
a processor configured to cause the apparatus to:
receive a power-management-initiating signal; and
group, in said apparatus, a plurality of outgoing communications into a single transmission transmitted by the transmitter in response to the power-management-initiating signal by delaying a first one of said outgoing communications for a predetermined period of time, and by grouping the delayed first outgoing communication with one or more additional outgoing communications that are requested during said predetermined period of time, wherein said predetermined period of time is determined by the apparatus waiting until it detects that a measured radio frequency (RF) field is stronger than a predetermined level.

11. The apparatus of claim 10, wherein said processor is further configured to cause the apparatus to reduce the power consumption of the apparatus by disabling high power outgoing communications in response to the power-management-initiating signal.

12. The apparatus of claim 10, further comprising:
first and second backlights for a display and keyboard, respectively, wherein the processor is further configured to cause the apparatus to disable one of said backlights, while enabling the other of said backlights, in response to the power-management-initiating signal.

13. The apparatus of claim 10, wherein the power-management-initiating signal is received in response to a user interface of the apparatus.

14. The apparatus of claim 10, wherein said grouping of said plurality of outgoing communications comprises grouping said communications based on assigned priority levels of said communications.

15. The apparatus of claim 10, wherein said grouping of said plurality of outgoing communications comprises grouping high priority communications for said single transmission, and deferring low priority communications until a subsequent transmission.

16. A non-transitory computer-readable storage medium having machine readable code that, when executed by an apparatus, causes the apparatus to:
receive a power-management-initiating signal; and
group a plurality of outgoing communications into a single transmission in response to the power-management-initiating signal by delaying a first one of said outgoing communications for a predetermined period of time, and by grouping the delayed first outgoing communication with one or more additional outgoing communications that are requested during said predetermined period of time, wherein said predetermined period of time is determined by the apparatus waiting until it detects that a measured radio frequency (RF) field is stronger than a predetermined level.

* * * * *